United States Patent
Moopath Velayudhan et al.

(10) Patent No.: US 9,722,915 B2
(45) Date of Patent: Aug. 1, 2017

(54) SYSTEM AND METHOD FOR MULTICAST ROUTING USING PEER GROUPS

(71) Applicant: Dell Products L.P., Round Rock, TX (US)

(72) Inventors: Mukesh Moopath Velayudhan, Fremont, CA (US); Mohnish Anumala, Cupertino, CA (US); Maheshwara Hampasagar, San Jose, CA (US); Jeyanth Christopher, Chennai (IN); Senthil Nathan Muthukaruppan, Chennai (IN)

(73) Assignee: DELL PRODUCTS L.P., Round Rock, TX (US)

( * ) Notice: Subject to any disclaimer, the term of this patent is extended or adjusted under 35 U.S.C. 154(b) by 464 days.

(21) Appl. No.: 14/265,242

(22) Filed: Apr. 29, 2014

(65) Prior Publication Data

US 2015/0312135 A1    Oct. 29, 2015

(51) Int. Cl.
*H04L 12/761* (2013.01)
*H04L 12/18* (2006.01)
*H04L 12/775* (2013.01)
*H04L 12/773* (2013.01)
*H04L 12/751* (2013.01)

(52) U.S. Cl.
CPC ............ *H04L 45/16* (2013.01); *H04L 12/185* (2013.01); *H04L 45/02* (2013.01); *H04L 45/58* (2013.01); *H04L 45/60* (2013.01)

(58) Field of Classification Search
CPC ... H04L 49/1523; H04L 49/201; H04L 49/15; H04L 49/45; H04L 45/16; H04L 12/185; H04L 45/02; H04L 45/60; H04L 45/58
See application file for complete search history.

(56) References Cited

U.S. PATENT DOCUMENTS

| | | | | |
|---|---|---|---|---|
| 2007/0086361 A1* | 4/2007 | Allan | ............ | H04L 12/462 370/254 |
| 2007/0253409 A1* | 11/2007 | Fu | ............ | H04L 12/185 370/389 |
| 2012/0002670 A1* | 1/2012 | Subramanian | ........ | H04L 45/583 370/389 |
| 2014/0195694 A1* | 7/2014 | Sait | ............ | H04L 45/18 709/239 |
| 2014/0294010 A1* | 10/2014 | Biswas | ............ | H04L 45/245 370/392 |
| 2014/0362854 A1* | 12/2014 | Addanki | ............ | H04L 12/185 370/390 |

* cited by examiner

*Primary Examiner* — Robert M Morlan
(74) *Attorney, Agent, or Firm* — Haynes & Boone, LLP

(57) ABSTRACT

A system and method for multicast routing using peer groups includes a router. The router includes a control unit and a memory coupled to the control unit. The memory stores one or more first multicast routing entries. The control unit is configured to receive a multicast packet on an input interface, determine one or more properties of the multicast packet, determine one or more output interfaces based on the properties and the first multicast routing entries, and forward copies of the multicast packet on each of the output interfaces. The router is configured to be coupled to a peer router via an inter-chassis link (ICL). The first multicast routing entries include one or more second multicast routing entries associated with multicast routing trees associated with the router and one or more third multicast routing entries associated with multicast routing trees associated with the peer router.

19 Claims, 4 Drawing Sheets

SYSTEM AND METHOD FOR MULTICAST ROUTING USING PEER GROUPS

BACKGROUND

The present disclosure relates generally to information handling systems, and more particularly to multicast routing in peer groups.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Additionally, some embodiments of information handling systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computer networks form the interconnection fabric that enables reliable and rapid communications between computer systems and data processors that are in both close proximity to each other and at distant locations. These networks create a vast spider web of intranets and internets for handling all types of communication and information. Making this possible is a vast array of network switching devices that make routing and/or forwarding decisions in order to deliver packets of information from a source system or first network node to a destination system or second network node. Due to the size, complexity, and dynamic nature of these networks, sophisticated network switching devices are often required to continuously make routing and/or forwarding decisions and to update routing and/or forwarding information as network configurations change.

One use for computer networks is the transmission of network packets from one source node to multiple destination nodes. One possible way of handling this is to have the source node create a copy of each network packet for each of the destination nodes and then send them separately over the network. This is typically inefficient when there are a large number of destination nodes. One approach that often improves the efficiency is to use a multicasting technique where copies of the network packets are made whenever routes to reach different destination nodes split. In this way just one copy of each network packet is transmitted over network segments that are shared between routes to different destination nodes. Support for multicasting has been incorporated in networks, such as the Internet, through the designation of certain destination addresses as multicasting addresses.

To support efficient multicasting, network switching devices, such as routers, typically employ a multicast routing protocol, such as one of the Protocol Independent Multicast (PIM) protocols, to learn the routes through a network between the source and the destination nodes. As the routes are learned, the multicast routing protocol helps the network switching devices identify those routes that may take advantage of shared segments and/or shortest paths so that routing and delivery of the multicast network packets to the destination nodes tends to utilize the least amount of bandwidth.

These multicast routing protocols generally work well when used on networks containing stand-alone network switching devices. However, modern computer networks are increasingly being designed using groups of two or more network switching devices that operate as a single virtual network switching device. The multicast routing protocols are generally not able to recognize these groups of network switching devices nor adequately take advantage of the backup and redundancy advantages they provide to computer networks.

Accordingly, it would be desirable to provide improved methods and systems for multicast routing in computer networks with groups of network switching devices.

SUMMARY

According to one embodiment, a router includes a control unit and a memory coupled to the control unit. The memory stores one or more first multicast routing entries. The control unit is configured to receive a multicast packet on an input interface, determine one or more properties of the multicast packet, determine one or more output interfaces based on the properties and the first multicast routing entries, and forward copies of the multicast packet on each of the output interfaces. The router is configured to be coupled to a peer router via an inter-chassis link (ICL). The first multicast routing entries include one or more second multicast routing entries associated with multicast routing trees associated with the router and one or more third multicast routing entries associated with multicast routing trees associated with the peer router.

According to another embodiment, a method of multicast routing includes receiving a multicast packet on an input interface of a router, determining one or more properties of the multicast packet, determining one or more output interfaces based on the properties and first multicast routing entries, and forwarding copies of the multicast packet on each of the output interfaces. The first multicast routing entries include one or more second multicast routing entries associated with multicast routing trees associated with the router and one or more third multicast routing entries associated with multicast routing trees associated with a peer router coupled to the router via an inter-chassis link (ICL).

According to yet another embodiment, an information handling system includes a peer group. The peer group includes a first router, a second router, and an inter-chassis link (ICL) coupling the first router and the second router. The first router includes a control unit and a memory coupled to the control unit. The memory stores one or more first multicast routing entries. The control unit is configured to receive a multicast packet on an input interface, determine one or more properties of the multicast packet, determine one or more output interfaces based on the properties and the first multicast routing entries, forward first copies of the multicast packet on each of the output interfaces, and forward a second copy of the multicast packet to the second router on the input interface using the ICL when the input interface is a spanned input interface. The first multicast routing entries include one or more local multicast routing entries associated with multicast routing trees associated with the first router and one or more synchronized multicast routing entries associated with multicast routing trees associated with the second router.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
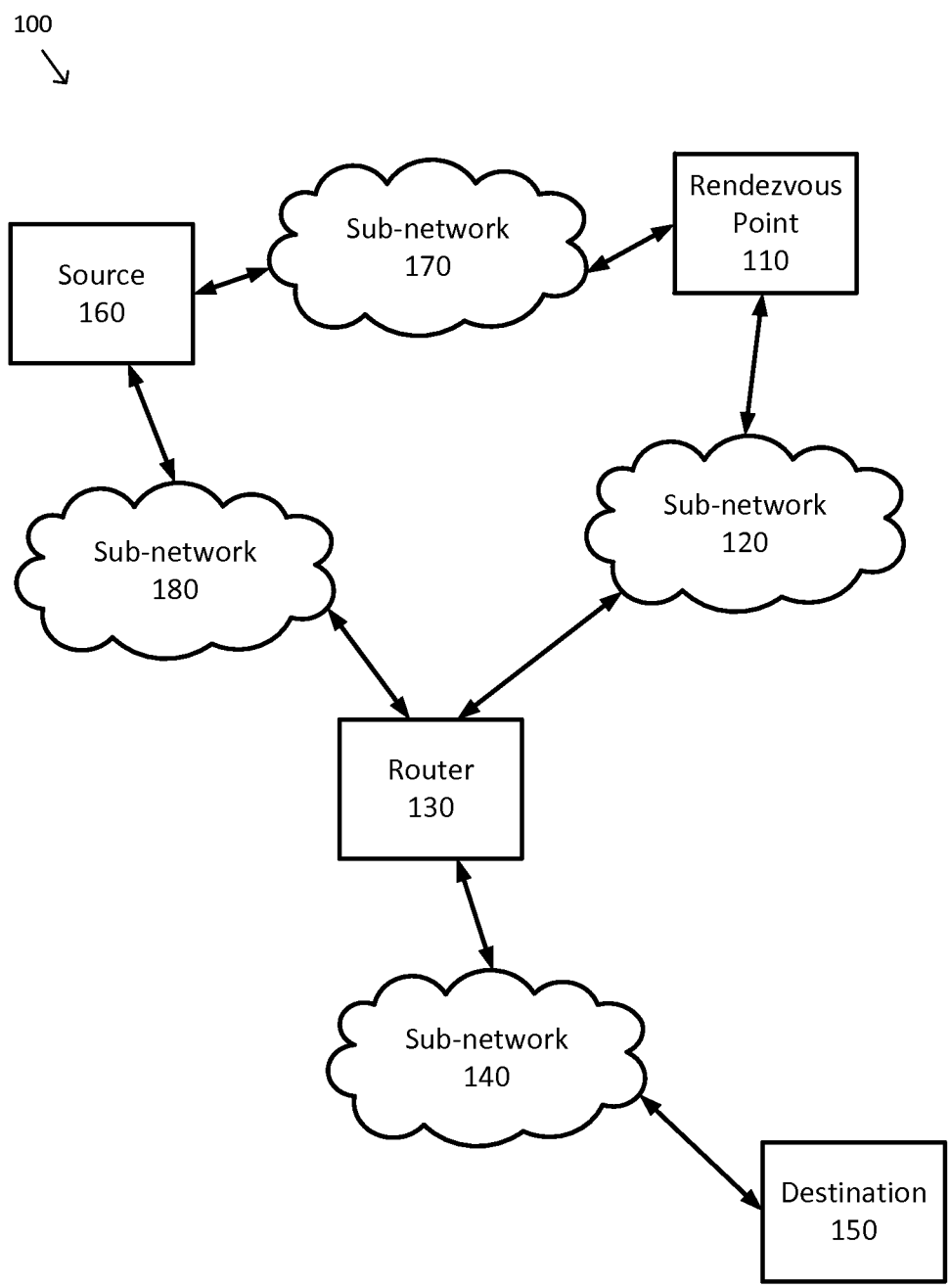
FIG. 1 is a simplified diagram of a network using multicasting according to some embodiments.

FIG. 1 is a simplified diagram of a network 100 using multicasting according to some embodiments. As shown in FIG. 1, network 100 is generally consistent with the use of a multicast routing protocol from the PIM family of routing protocols. In the examples of FIG. 1, multicast routing may initially focus around a router 110 designated as a rendezvous point 110. At the initial stages of multicast routing, rendezvous point 110 acts as a central distribution point for distribution of multicast packets using a publish-subscribe pattern of distribution. Network packets for a particular multicast group (G) are sent to rendezvous point 110 for distribution to destination nodes that have requested and/or subscribed to group G. In some examples, group G may be identified by an internet protocol (IP) address from a range of IP addresses reserved for multicasting.

The routers in network 100 between rendezvous point 110 and the subscribing destinations exchange various multicast routing protocol packets to discover the topology of network 100 and to build a shared multicast routing tree that provides shortest paths between rendezvous point 110 and each of the subscribing destinations that also takes advantage of shared network segments between the routers. The use of shared network segments helps to avoid duplication of the multicast packets except where the distribution tree splits and different routes are used to reach different subsets of the destinations. Under the PIM family of multicast routing protocols, each of the destinations registers interest in group G by making a request to an adjoining multicast router. The adjoining multicast router then learns the shortest path to rendezvous point 110 with the intervening routers adding segments to the shared multicast routing tree to include this destination as a leaf in the shared multicast routing tree.

To keep track of the shared multicast routing tree, each of the routers on the shared multicast routing tree maintain a generic multicast routing entry for each group G where that router is part of the shared multicast routing tree between rendezvous point 110 and the various destinations. In some examples, each generic multicast routing entry for a group G, which may be designated using the notation (*,G), includes at least the following three pieces of information: an incoming interface (IIF) on which multicast packets for distribution using the shared multicast routing tree are received, a multicast group address (G), and a list of outgoing interfaces (OIFs) on which incoming multicast packets for distribution to group G are to be forwarded/replicated. In some examples, the IIF and each of the OIFs may be designated by an address, such as an IP address, that identifies the network segment on which multicast packets for group G are respectively received and forwarded/replicated. In some examples, the IIF and/or OIF addresses may correspond to a virtual local area network (VLAN) in network 100. When just one OIF is included in the list, the incoming multicast packet is forwarded to just a single router, but when more than one OIF is included in the list, the incoming multicast packet is duplicated and forwarded on each of the OIFs. In this later case, the duplication corresponds to a split in the shared multicast routing tree. In some examples, the routers may use the IIF in the (*.G) entry to communicate upstream to rendezvous point 110.

Network 100 shows an example of how the shared multicast routing tree may be configured. As shown in FIG. 1, rendezvous point 110 is coupled via a sub-network 120 to a router 130, and router 130 is coupled via a sub-network 140 to a destination 150. When the multicast routing protocol determines that router 130 is to be part of the shared multicast routing tree for group G, router 130 maintains a generic multicast routing entry (*,G) with the IIF corresponding to the address of the network segment that couples router 130 to sub-network 140 and the OIF list includes as least the address of the network segment that couples router 130 to sub-network 120. When router 130 receives a packet with a designation address that corresponds to group G, it may use the (*,G) multicast routing entry to forward the packet on the network segment to sub-network 140 because the (*,G) entry includes the OIF for the network segment to sub-network 140. Rendezvous point 110 also includes a corresponding (*,G) entry that includes at least the OIF for the network segment between rendezvous point 110 and sub-network 120. Each of the sub-networks 120 and 140 may further include one or more routers with corresponding (*,G) entries that link rendezvous point 110 to router 130 and router 130 to destination 150, respectively, via the shared multicast routing tree.

When a source 160 wants to distribute multicast packets to a group G, it may do so by forwarding each of the multicast packets to rendezvous point 110 using a sub-network 170. In some examples, source 160 and the routers in sub-network 170 may learn the route to rendezvous point 110 using unicast routing discovery mechanisms. Source 160 forwards the multicast packets to rendezvous point 110 because rendezvous point 110 is the head of the shared multicast routing tree for group G. When rendezvous point 110 receives the multicast packets, it uses its (*,G) entry to begin their distribution on the shared multicast routing tree where at least the copies for destination 150 are distributed through sub-network 120, router 130, and sub-network 140 using the (*,G) entries of each of the routers along the shared multicast routing tree.

When router 130 receives a multicast packet from source 160 for distribution via its (*,G) entry, it may recognize that it knows a shorter path between itself and source 160 using a sub-network 180. In some examples, the shorter path may be included in unicast routing entries being maintained by router 130. Realizing that bypassing rendezvous point 110 and receiving multicast packets from source 160 through sub-network 180 may be more efficient, router 130 may add a source specific multicast routing entry (S,G) that includes at least the IIF coupling router 130 to sub-network 180, the address S of source 160, the multicast group address G, and the list of OIFs from the (*,G) entry. Other routers in sub-network 160 may include similar (*,G) entries. The (*,G) entry is retained to handle multicast routing from sources other than source 160. When router 130 includes both a (*,G) and an (S,G) entry for the same group it may implement one of two forwarding approaches. In a Type I approach, incoming multicast packets from source S received on the IIF of the (S,G) entry are forwarded based on the (S,G) entry and incoming multicast packets from source S received on any other IIF, including the IIF in the (*,G) entry are dropped. In a Type II approach, incoming multicast packets from source S are forwarded using the (S,G) entry when the IIF matches the IIF of the (S,G) entry and forwarded using the (*,G) entry when the IIF matches the IIF of the (*,G) entry.

Because multiple sources may distribute to the same multicast group G, a mechanism also exists where destinations may unsubscribe from specific sources while still subscribing to the group. In some examples, this is supported using a source-specific prune request. When a router receives a source-specific prune request on one of its OIFs for a group G, it learns that multicast packets from source S for group G are not to be forwarded using that OIF as there are no longer any destinations that are subscribed via that route. When the router already maintains a corresponding (S,G) entry, it may remove the OIF from the list of OIFs in the corresponding (S,G) entry. The router may also remove the OIF from the shared multicast routing tree by copying the (*,G) entry for the group, adding the source S, and removing the pruned OIF to create a (S,G,rpt) entry that overrides the (*,G) entry for source S while still using the remaining subset of the shared multicast routing tree that remains after the OIF is pruned from the shared multicast routing tree. In some examples, it is possible for a router to maintain an (S,G,rpt) entry that includes an empty OIF list. When this happens any incoming packets for group G from source S are dropped. In some examples, when the OIF list of the (S,G,rpt) entry is empty, the router may also send a source-specific prune request via the IIF indicating that the router has no destinations for multicast packets from source S for group G. In some examples, a source-specific prune request may be withdrawn by a source-specific join request, which reverses the pruning.

In a network of stand-alone routers, the multicast routing protocol is generally resilient to changes and/or failures in the network. As routers and/or network segments go up and down, the multicast routing protocol is able to discover the changes and then provide any updates for the shortest paths in both the shared multicast routing tree and the source-specific multicast routing trees. Consequently, appropriate updates are made to the (*,G), (S,G), and (S,G,rpt) entries of the routers so that multicast packets continue to be delivered, but they may be subject to some delay and/or interruption. Many networks, however, may include one or more of routers that are replaced with groups of two or more routers that operate as a single virtual router. This is often done to provide redundancy and/or resilience when one or more of the routers and/or one or more of the network segments goes down. The multicast routing protocols are generally not able to recognize the router groups, account for the variations in routing patterns they may introduce, and take advantage of the redundancy they offer. For example, an appropriately configured router group may be able to more quickly respond to failures in the network, by pre-configuring alternate routes within the router group.

Figure 2:
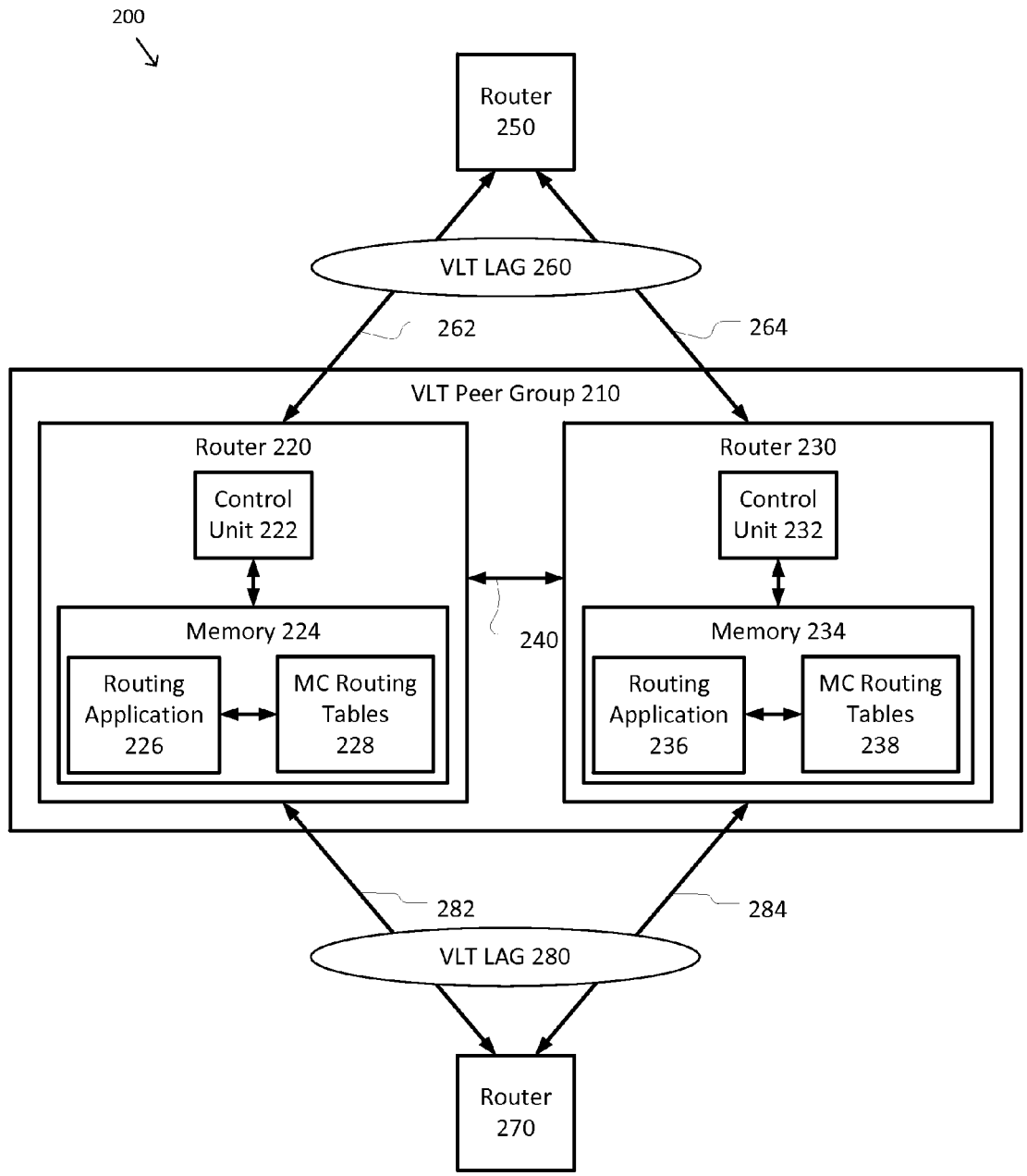
FIG. 2 is a simplified diagram of a network according to some embodiments.

FIG. 2 is a simplified diagram of a network 200 according to some embodiments. As shown in FIG. 2, network 200 includes a pair of routers 220 and 230 configured as a virtual link trunking (VLT) peer group 210. Routers 220 and 230 are considered to be peers to each other and provide both parallelism and redundancy to the routing and other forwarding functions by acting in cooperation. In some examples, both of the routers 220 and 230 may be separately coupled to nearby routers and/or switches using network links, such as routers 250 and 270. In some examples, each of the network links is coupled to a respective network port in router 220 and/or 230. Because routers 250 and 270 are coupled to both routers 220 and 230, routers 250 and 270 may use either router 220 or router 230 to exchange network traffic. This parallelism may increase the bandwidth available between routers 250 and 270, and it may also provide redundancy that allows network traffic to move between routers 250 and 270 even when either of routers 220 or 230 goes down and/or one of the network links goes down. Routers 220 and 230 may also exchange management information between themselves, such as routing and forwarding tables, so that routers 220 and/or 230 are ready to provide backup for the other. In some examples, VLT peer group 210 may replace any of the routers, such as router 130, in network 100.

As shown in FIG. 2, router 220 includes a control unit 222 coupled to memory 224 and router 230 includes a control unit 232 coupled to memory 234. Each of control units 222 and/or 232 may control the operation of its respective router 220 and/or 230. In some examples, control units 222 and/or 232 may each include one or more processors, central processing units, virtual machines, microcontrollers, application specific integrated circuits (ASICs), field programmable gate arrays (FPGAs), and/or the like.

Memory 224 may be used to store one or more applications and one or more data structures, such as a representative routing application 226 and one or more multicast routing tables 228. Similarly, memory 234 may be used to store one or more applications and one or more data structures, such as a representative routing application 236 and one or more multicast routing tables 238. In some examples, the multicast routing tables 228 and/or 238 may be multicast route information bases. Memories 224 and/or 234 may also include other routing and forwarding tables such as one or more virtual LAN tables, link aggregation group (LAG) tables, layer 2 (L2) next hop tables, layer 3 (L3) routing tables, L3 forwarding information bases (FIBs), flow tables, and/or the like to support the routing functions of routing applications 226 and/or 236. Memories 224 and/or 234 may each include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Routers 220 and 230 are also coupled to each other using one or more network links often referred to as an inter-chassis link (ICL) 240. In some examples, each of the network links is coupled to routers 220 and 230 using a respective network port or port of routers 220 and/or 230. In some examples, the network links of ICL 240 are often treated as a single routing or forwarding LAG. This allows control units 222 and/or 232 to forward network traffic between routers 220 and 230 using any of the networks links in ICL 240 by designating delivery of the network traffic using a destination address that identifies ICL 240. In some examples, both routers 230 and 230 provide a LAG hashing mechanism that selects from any of the two or more network links in LAG 240. Routers 220 and 230 may exchange management, routing, forwarding, and/or other similar information using ICL 240. In some examples, the LAG of ICL 240 may also be a member of multiple VLANs as is described later.

To better take advantage of the parallelism and/or redundancy provided by VLT peer group 210, routers 250 and 270 may also use LAGs and/or VLANs when routing and/or forwarding network traffic using VLT peer group 210. As shown, router 250 may use a VLT LAG 260 to bundle together one or more network links 262 coupling router 250 to router 220 and one or more network links 264 coupling router 250 to router 230. Rather than making decisions about whether to route network traffic to either router 220 or 230, router 250 may route and/or forward network traffic to VLT LAG 260 and allow the LAG hashing mechanism of VLT LAG 260 to select between any of the network links 262 and 264. This allows router 250 to direct network traffic to router 270 without worrying about whether it is routed through router 220 or 230. In some examples, VLT LAG 260 may be assigned a corresponding VLAN ID that the routing tables in router 250 may use as the next hop for network traffic that may use either router 220 or 230. Similarly, router 270 may use a VLT LAG 280 to bundle together one or more network links 282 coupling router 270 to router 220 and one or more network links 284 coupling router 270 to router 230. In some examples, VLT LAG 280 may be assigned a corresponding VLAN ID that the routing tables in router 270 may use as the next hop for network traffic that may use either router 220 or 230. In some examples, the VLANs of VLT LAGs 260 and/or 280 may be referred to as spanned VLANs because they may be used to reach both routers 220 and 230 in VLT peer group 210.

To support multicasting, routers 220 and 230 maintain multicast routing tables 228 and 238, respectively. And although multicast routing tables 228 and/or 238 are characterized as tables, any suitable data structure and/or a database may be used to maintain multicast routing tables 228 and/or 238. Multicast routing tables 228 and/or 238 may each include one or more (*,G), (S,G), and/or (S,G,rpt) routing entries depending upon the number of multicast routing trees the respective routers 220 and 230 belong to. Because routers 220 and 230 are separate physical routers, the multicast routing protocol, such as any of the PIM family of protocols, may make routers 220 and 230 members of different multicast routing trees. In some examples, the membership in different multicast routing trees may be due to routers 220 and/or 230 having network links that couple just one of routers 220 or 230 to another router, such as when a VLAN used to route traffic to either router 220 or 230 is not a spanned VLAN because the VLAN does not have network links for both router 220 and 230. In some examples, the multicast routing protocol may include just one of router 220 and/or 230 in a particular multicast routing tree. In some examples, both routers 220 and 230 cannot be added to a multicast routing tree in parallel as this would inefficiently duplicate the multicast packets with one set of copies being forwarded by router 220 and another set of copies being forwarded by router 230 to the same spanned VLANs. In some examples, routers 220 and 230 may also have different multicast routing entries for different parts of a multicast routing tree, such as when either router 250 and/or 270 is a split point in the multicast routing tree with different OIFs to router 220 and 230 in a multicast routing entry.

Because routers 220 and 230 may include different multicast routing entries, the existence of VLT peer group 210 may result in lost and/or dropped multicast traffic. In some examples, the LAG hashing mechanism of VLT LAGs 260 and/or 280 may inadvertently forward a multicast packet to the wrong one of router 220 or router 230, and because the wrong router does not have the appropriate multicast routing entries, it cannot forward the multicast packet on the right multicast routing tree. In some examples, the LAG hashing mechanism of VLT LAGs 260 and/or 280 may fail to forward a multicast packet to both routers 220 and 230 when router 250 and/or 270 have multicast routing entries with OIFs designating both of routers 220 and 230. Further, without sharing information about their respective multicast routing entries, routers 220 and 230 are not able to provide backup and/or redundancy for each other. Additionally, unlike the case with unicast forwarding entries, routers 220 and 230 are not able to simply duplicate copies of their respective multicast routing entries as this may introduce undesirable duplications in the multicast routing packets as both routers 220 and 230 forward packets to the same OIFs. In some examples, the duplicated multicast routing entries may also include OIFs that are not directly accessible to the peer router creating problems when the peer router attempts to use the duplicated multicast routing entries.

To address the issues with multicast routing, routers 220 and/or 230 and their routing applications 226 and/or 228 should be enhanced to address the problems caused by LAG hashing to the wrong one of the routers 220 or 230 as well as to more appropriately share multicast routing entries to avoid undesirable duplication of multicast packets.

In some embodiments, multicast problems created by LAG hashing may be addressed by identifying each of the spanned VLANs used to forward multicast and other network traffic to routers 220 and 230, such as the spanned VLANs of VLT LAGS 260 and 280, and associating those VLANs with ICL 240. In this way, when multicast packets are forwarded between routers 220 and 230 using ICL 240, such as due to LAG hashing to the wrong one of routers 220 or 230, the multicast packets may be forwarded to router 220 and/or 230 using the same IIF that would have been used had the multicast packets been forwarded to the correct one of the routers 220 or 230. In some examples, this allows routers 220 and 230 to match the IIF of the multicast routing entries to the IIFs in the multicast routing entries as if the router 220 and/or 230 had received the multicast packet directly. In some examples, routers 220 and/or 230 may also forward any multicast packet received on a spanned VLAN on ICL 240 using the IIF corresponding to the spanned VLAN as the destination address to avoid any multicast packet loss due to LAG hashing to the wrong one of routers 220 or 230. In some examples, undesirable duplication of multicast packets received over ICL 240 may be addressed by dropping the multicast packets to OIFs corresponding to spanned VLANs unless it is known that corresponding outgoing network links in the peer router are down.

In some embodiments, sharing of multicast routing entries between routers 220 and 230 may also occur so that routers 220 and/or 230 may provide backup and/or redundancy for each other. In some examples, the sharing of multicast routing entries may be limited to multicast routing entries with an IIF that is a spanned VLAN and with OIFs from the OIF lists that are spanned VLANs. This is because routers 220 and 230 may provide redundancy for multicast routing tree segments just to those routers reachable from both routers 220 and 230. In some examples, the multicast routing entries may also be tagged so that it is known whether the OIFs in the OIF lists correspond to OIFs added to the OIF lists by the multicast routing protocol (local entries) and OIFs added to the OIF lists to provide backup for the peer router (synchronized entries). In some examples, each of the synchronized entries may be associated with a timer that starts when the peer router goes down and triggers deletion of the synchronized entries when the timer expires. Use of the timer allows the synchronized entries to provide backup for the peer router for a limited period of time until the multicast routing protocol is able to update the multicast routing trees to account for the loss of the peer router in the network.

Figure 3:
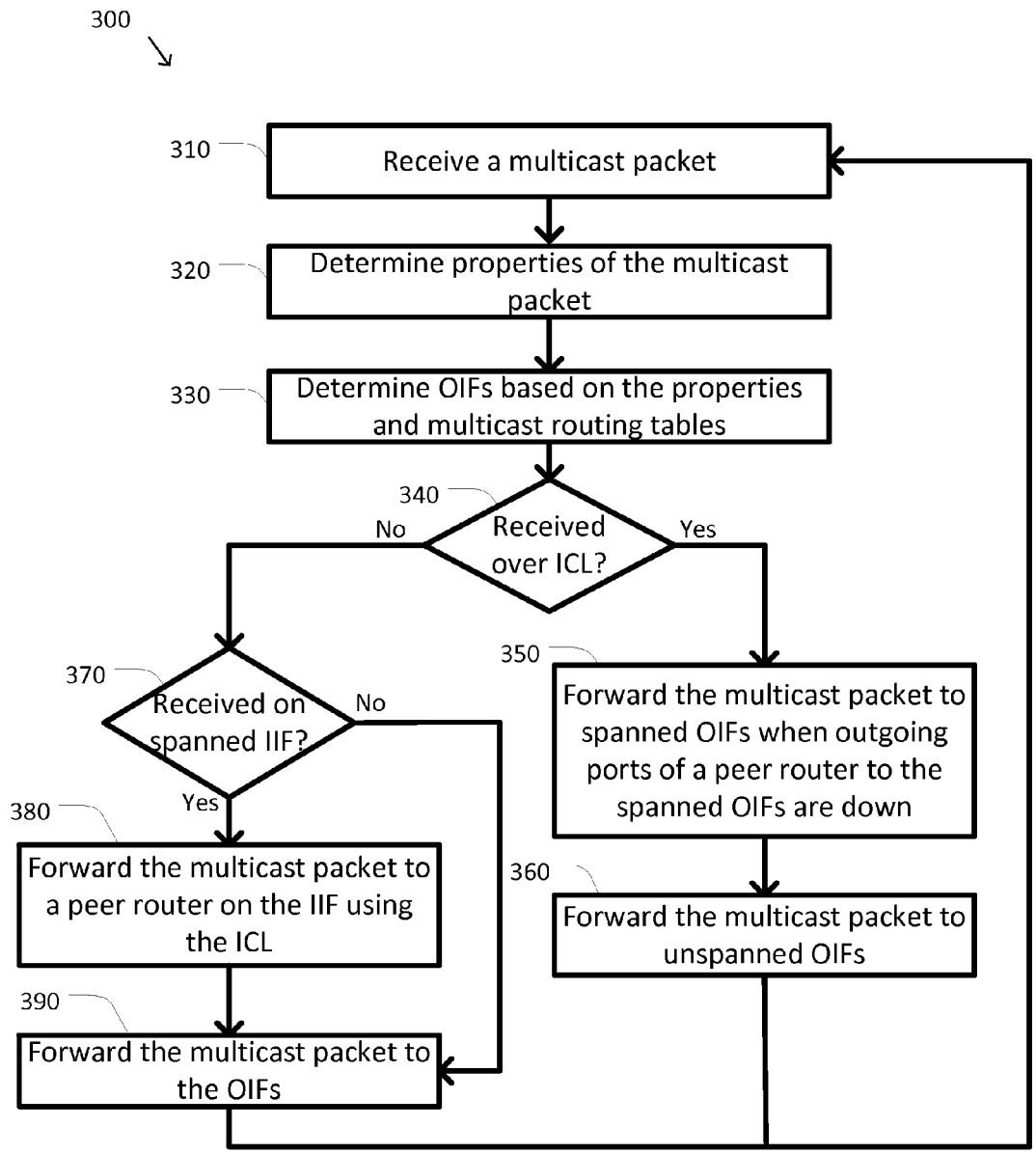
FIG. 3 is a simplified diagram of a method of multicast routing according to some embodiments.

FIG. 3 is a simplified diagram of a method 300 of multicast routing according to some embodiments. In some embodiments, one or more of the processes 310-390 of method 300 may be implemented, at least in part, in the form of executable code stored on non-transient, tangible, machine readable media that when run by one or more processors (e.g., the one or more processors of control units 222 and/or 232) may cause the one or more processors to perform one or more of the processes 310-390. In some embodiments, method 300 may be performed in a router that is part of a VLT peer group, such as router 220 and/or 230, and/or by a routing application, such as routing application 226 and/or 236.

At a process 310, a multicast packet is received. The multicast packet may be received at one of the multicast routers in a VLT peer group, such as router 220 and/or 230. The multicast packet may be received from another multicast router coupled to the receiving router via a network link. In some examples, the multicast packet may be determined to be a multicast packet based on a destination address that corresponds to an address reserved for multicast network traffic. In some examples, the destination address may be an IPv4 address in the range 224.0.0.0 to 239.255.255.255.

At a process 320, properties of the multicast packet are determined. The router examines information associated with the multicast packet received during process 310 to determine one or more properties of the multicast packet. In some examples, the properties may include an IIF for the multicast packet that corresponds to the network link on which the multicast packet was received. In some examples, the properties may include a source address corresponding to the source, S, that generated the multicast packet. In some examples, the properties may include a destination and/or multicast group address, G, corresponding to the group of destinations that is to receive a copy of the multicast packet. In some examples, one or more of the properties may be determined by examining one or more header fields in the multicast packet.

At a process 330, OIFs are determined based on the properties and multicast routing tables. The one or more properties determined during process 320 are used to find one or more matching multicast routing entries in the multicast routing tables of the router. Based on the matching multicast routing entries, zero or more OIFs on which the multicast packet is to be forwarded may be determined. In some examples, the number of OIFs may be zero when no matching multicast routing entry is found in the multicast routing tables and/or when the matching multicast routing entry includes an empty OIF list indicating that corresponding multicast routing packets are to be dropped. In some examples, the multicast routing tables may include any number of (*,G), (S,G), and/or (S,G,rpt) entries, which may include local OIF entries and/or synchronized OIF entries. In some examples, the multicast routing entries may be matched to the multicast packet using one or more of the IIF, S, and/or G properties determined during process 320. In some examples, when a more specific multicast routing entry (e.g., an (S,G) and/or an (S,G,rpt) entry) is found, it may override a more generic multicast routing entry (e.g., a (*,G) entry). In some, examples, when the multicast routing tables include a matching (S,G) entry and the router uses a Type I routing approach, the OIFs are selected from the matching (S,G) when the IIF of the multicast packet matches the IIF of the (S,G) entry, and for any other IIF, the OIF list is empty. In some, examples, when the multicast routing tables include a matching (S,G) entry and the router uses a Type II routing approach, the OIFs from the (S,G) entry are selected when the IIF of the multicast packet matches the IIF of the (S,G) entry and the OIFs from the (*,G) entry are selected when the IIF of the multicast packet matches the IIF of the (*,G) entry.

At the process 340, it is determined whether the multicast packet was received over the ICL. When the multicast packet was received over the ICL between the router and the peer router during process 310, it is possible that the peer router may have already forwarded the multicast packet to one or more spanned OIFs. To avoid undesirable duplication of the multicast packet, the router should not forward the multicast packet to spanned OIFs unless it is known that the network links of the peer router to the spanned OIFs are down. In some examples, the router may determine whether the multicast packet is received over the ICL based on the network link on which it is received. When the multicast packet is received over the ICL, it is forwarded beginning with a process 350. When the multicast packet is not received over the ICL, it is forwarded beginning with a process 370.

At the process 350, the multicast packet is forwarded to spanned OIFs when outgoing ports of the peer router to the spanned OIFs are down. To avoid undesirable duplication of the multicast packet when it is received over the ICL, the router determines the status of the ports/network links coupling the peer router to the spanned OIFs determined during process 330. In some examples, the router may determine the status of the ports of the peer router through the exchange of one or more management messages over the ICL with the peer router. Each of the OIFs determined during process 330 are examined to determine whether they are spanned OIFs. In some examples, the router may maintain a list of spanned interfaces, including spanned IIFs and OIFs and may use the list of spanned interfaces to determine whether each OIF is spanned. When an OIFs is a spanned OIF and at least one of the corresponding ports in the peer router is up, the multicast packet is not forwarded to that OIF by the router. When the OIFs is a spanned OIF and each of the corresponding ports in the peer router is down, the multicast packet is forwarded to that OIF by the router. In some examples, the router makes no distinction between whether the spanned OIF is a local OIF entry or a synchronized OIF entry. In some examples, the forwarded copies of the multicast packet may be inserted into outgoing transmission queues for each of the spanned OIFs on which the multicast packet is to be forwarded.

At a process 360, the multicast packet is forwarded to unspanned OIFs. Because the peer router does not have access to and does not forward packets to unspanned OIFs of the router, the multicast packet is forwarded to each of the OIFs determined during process 330 that is an unspanned OIF. In some examples, each of the unspanned OIFs may be local OIFs. In some examples, the forwarded copies of the multicast packet may be inserted into outgoing transmission queues for each of the unspanned OIFs. Once process 360, completes, method 300 returns to process 310 to await receipt of another multicast packet.

At the process 370, it is determined whether the multicast packet is received on a spanned IIF. When the multicast packet received during process 310 is received on a spanned IIF, but not on the ICL itself, it is possible that the multicast packet may have been inadvertently hashed to the router instead of the peer router and/or should be forwarded to both the router and the peer router. In some examples, the router may consult the list of spanned interfaces to determine whether the IIF determined during process 320 is a spanned IIF. When the IIF is a spanned IIF, the multicast packet is forwarded beginning with a process 380. When the IIF is not a spanned IIF, the multicast packet may be forwarded using a process 390.

At the process 380, the multicast packet is forwarded to the peer router on the IIF using the ICL. To prevent loss of multicast packets due to inadvertent hashing and/or failures to forward the multicast packet to both the router and the peer router, the multicast packet is forwarded over the ICL. Because replication or duplication of the multicast packet over the ICL is unnecessary, a single copy of the multicast packet is forwarded on the ICL. When the multicast packet is forwarded on the ICL it is sent to the IIF so that when the peer router receives the multicast packet, it may determine the IIF on which the peer router would have received the multicast packet had it been forwarded to the peer router directly. In some examples, this may allow the peer router to forward the multicast packet based on its multicast routing tables and its corresponding processes 350 and/or 360. In some examples, the multicast packet may be inserted into an outgoing queue for the ICL. In some embodiments, when the peer router and/or the ICL is down, the process 380 may be omitted.

At the process 390, the multicast packet is forwarded to the OIFs. The router forwards the multicast packet to each of the OIFs determined during process 330. In some examples, the multicast packet is forwarded using both local and synchronized OIF entries from the multicast routing tables. In some examples, the multicast packet may be forwarded by duplicating it for each of the OIFs and then transmitting a copy on each of the OIFs. In some examples, when no OIFs are determined for the multicast packet during process 330, the multicast packet is dropped. In some examples, the forwarded copies of the multicast packet may be inserted into outgoing transmission queues for each of the OIFs. Once process 390 completes, method 300 returns to process 310 to await receipt of another multicast packet.

Figure 4:
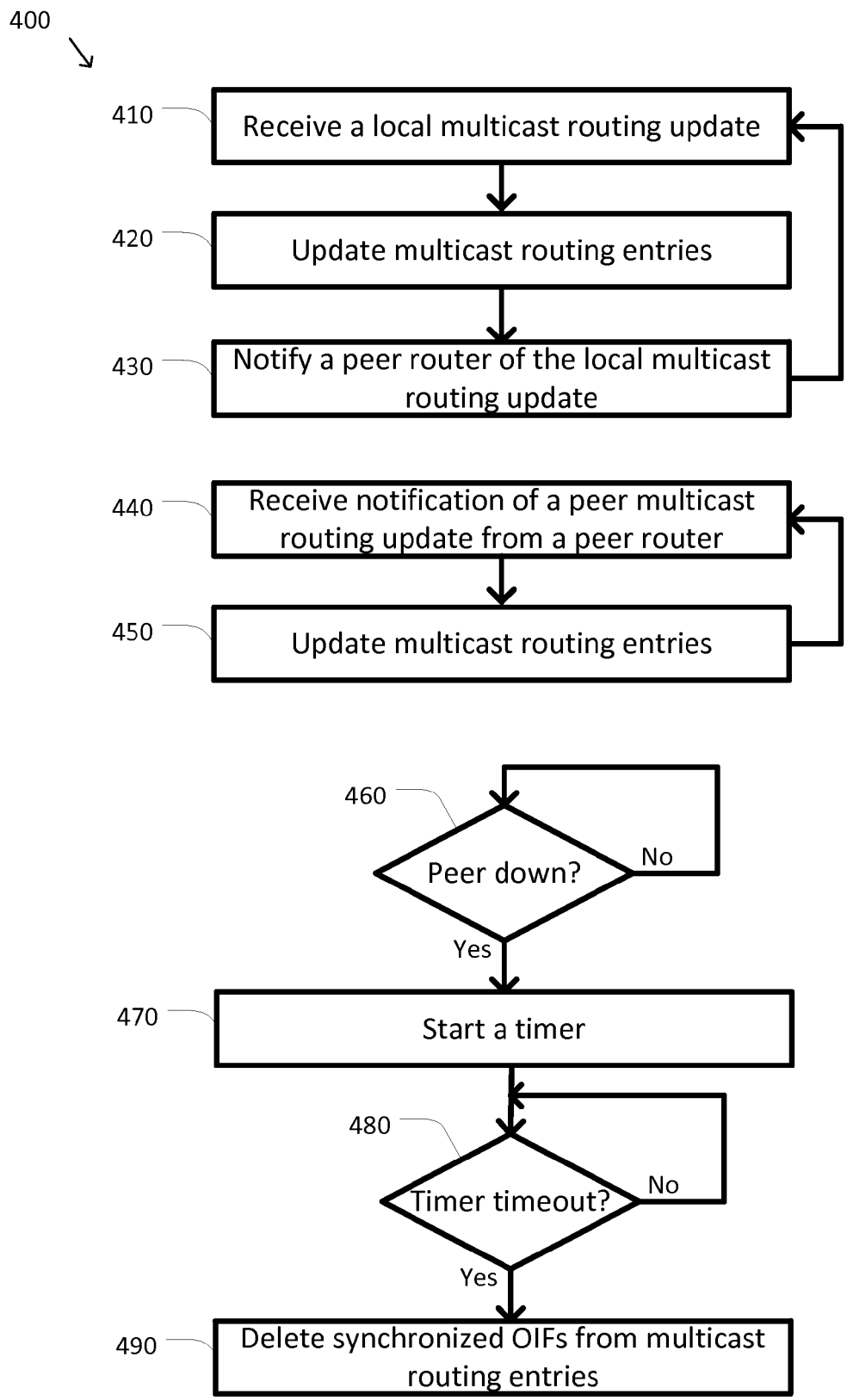
FIG. 4 is a simplified diagram of a method of multicast routing management according to some embodiments.

FIG. 4 is a simplified diagram of a method 400 of multicast routing management according to some embodiments. In some embodiments, one or more of the processes 410-490 of method 400 may be implemented, at least in part, in the form of executable code stored on non-transient, tangible, machine readable media that when run by one or more processors (e.g., the one or more processors of control units 222 and/or 232) may cause the one or more processors to perform one or more of the processes 410-490. In some embodiments, method 400 may be performed in a router that is part of a VLT peer group, such as router 220 and/or 230, and/or by a routing application, such as routing application 226 and/or 236.

As shown in FIG. 4, method 400 includes three semi-independent processing loops. A first loop (processes 410-430) addresses the handling of multicast routing updates received as part of the multicast routing protocol, such as any of the protocols in the PIM family of protocols. In some examples, the multicast routing updates from the multicast routing protocol may be referred to as local updates as the update begins with updates to the local multicast routing entries and may result in changes to one or more local entries of the multicast routing tables in the router processing the updates. A second loop (processes 440 and 450) addresses the handling of notifications of multicast routing updates received from a peer router. In some examples, the multicast routing updates from the peer router may be referred to as peer updates as the update begins with updates to the multicast routing entries of the peer router and may result in changes to one or more synchronized entries in the multicast routing tables of the router processing the updates. A third loop (processes 460-490) addresses the management of synchronized entries when the peer router goes down. In some embodiments, the first, second, and/or third loops may be handled by different threads, and/or the like in the router.

At a process 410, a local multicast routing update is received. In some examples, the local multicast routing update may be received as part of the multicast routing protocol being used in the network that includes the router receiving the multicast routing update. In some examples, the local multicast routing update may be the result of the creation, deletion, and/or modification of a shared multicast routing tree for a group (e.g., an update affecting a local (*,G) routing entry), creation, deletion, and/or modification of a source-specific multicast routing tree for a group (e.g., an update affecting a local (S,G) routing entry), creation, deletion, and/or modification of a source specific multicast routing entry using the shared multicast routing tree (e.g., an (S,G,rpt) entry resulting from use of a source-specific prune request), and/or the like.

At a process 420, one or more multicast routing entries are updated. In much the same fashion that a non-peered router manages multicast routing updates, the router receiving the local multicast update may update its multicast routing entries with local OIFs based on the local multicast routing update received during process 410. In some examples, this may include creating local multicast routing entries, deleting multicast routing entries, adding local OIFs to OIF lists in the multicast routing entries, and/or removing local OIFs from the OIF lists in the multicast routing entries as dictated by the multicast routing protocol being used by the router and the network. In some examples, when the multicast routing entries include synchronized entries that include one or more synchronized OIFs from a peer router, the local entries may be merged with the synchronized entries. In some examples, this merging may include changing an OIF in an OIF list from a synchronized OIF to a local OIF because the local OIF may override the synchronized OIF. In some example, the merging may include keeping copies of both the local and synchronized entry for the OIF.

In addition to merging entries, the presence of one or more synchronized OIFs in the OIF lists of multicast routing entries that match the IIF, S, and/or G of the local multicast routing update may indicate that additional changes are to be made to the multicast routing entries. In some examples, the additional changes may depend on the various possible combinations of both synchronized and/or local (*,G), (S,G), and/or (S,G,rpt) multicast routing entries being managed by the router. In some examples, Table I describes the updates that are made to the multicast routing entries based on the type of the local multicast routing update and the existing multicast routing entries with IIF, S, and/or G values that match the local multicast routing update received during process 410. In some examples, a source-specific prune request may be generated to remove the router from the multicast distribution tree upstream of the router to avoid undesirable duplication of multicast packets received at a later time. In some examples, when a (*,G) and/or a (S,G) entry includes no OIFs in the OIF list after the update, the corresponding entry may be deleted. In some examples, different updates may occur depending on whether the router uses a Type I or Type II approach for (S,G) entries.

TABLE I

| Local Update | Existing Entries | Update(s) |
|---|---|---|
| Add a local OIF to a (*, G) entry or create a (*, G) entry with local OIFs | Synchronized (*, G) entry found by no synchronized (S, G) or (S, G, rpt) entries found | Merge local (*, G) OIFs with the synchronized (*, G) OIFs |
| | Synchronized (S, G) or (S, G, rpt) entries found but no local (S, G) or (S, G, rpt) entries found | Merge the local (*, G) OIFs with the synchronized (*, G) OIFs<br>Type I: Merge the local (*, G) OIFs with the synchronized (S, G) and (S, G, rpt) entries<br>Type II: Merge the local (*, G) OIFs with the synchronized (S, G) and (S, G, rpt) entries when their IIFs are the same |
| | Both local and synchronized (S, G) or (S, G, rpt) entries found | Merge the local (*, G) OIFs with the synchronized (*, G) OIFs |
| Remove a local OIF from a (*, G) entry or delete a local (*, G) entry with local OIFs | Synchronized (S, G) or (S, G, rpt) entries found, but no local (S, G) or (S, G, rpt) entries found | Remove the local (*, G) OIFs from the (*, G) entry<br>Remove the local (*, G) OIF from each of the synchronized (S, G) and (S, G, rpt) entries |
| | Both local and synchronized (S, G) or (S, G, rpt) entries found | Remove the local (*, G) OIFs from the (*, G) entry |
| Create a local (S, G) entry with local OIFs | Synchronized (S, G) entry found, but no synchronized (*, G) or (S, G, rpt) entries found | Merge the local (S, G) OIFs with the synchronized (S, G) OIFs |
| | Synchronized (*, G) or (S, G, rpt) entry found | Type I: Merge the synchronized (*, G) and (S, G, rpt) OIFs into the local (S, G) entry<br>Type II: Merge the synchronized (*, G) and (S, G, rpt) OIFs into the local (S, G) entry when their IIFs are the same |
| Delete a local (S, G) entry with local OIFs | All cases | Remove the local OIFs from the (S, G) entry |
| Create a local (S, G, rpt) entry with local OIFs or add a local OIF to an (S, G, rpt) entry | Synchronized (S, G, rpt) entry found, but no synchronized (S, G) entry found | Merge the local (S, G, rpt) OIFs with the synchronized (S, G, rpt) entries |
| | Synchronized (S, G) entry found | Type I: Merge the local (S, G, rpt) OIFs with the synchronized (S, G) entry<br>Type II: Merge the local (S, G, rpt) OIFs with the synchronized (S, G) entry when their IIFs are the same |

TABLE I-continued

| Local Update | Existing Entries | Update(s) |
|---|---|---|
| | Synchronized (*, G) entry found, but no synchronized (S, G) or (S, G, rpt) entries found | Merge the synchronized (*, G) OIFs into the (S, G, rpt) entry |
| Delete a local (S, G, rpt) entry with local OIFs or remove a local OIF from an (S, G, rpt) entry | No synchronized (S, G) entry found | Remove the OIFs from the synchronized (S, G, rpt) entries |
| | Synchronized (S, G) entry found, but no synchronized (S, G, rpt) entry found | Remove the OIFs from the synchronized (S, G) entries |

At a process 430, the peer router is notified of the local multicast routing update. The router notifies the peer router of the local multicast routing update received during process 410, so that the peer router may add, modify, and/or remove one or more synchronized multicast routing entries in the multicast routing tables of the peer router. By notifying the peer router of the local multicast routing update, the peer router is able to provide the backup and/or redundancy in multicast routing supported by the multicast routing of method 300. In some examples, the peer router may be notified using one or more messages transmitted over the ICL between the router and the peer router. In some examples, the notification may include the IIF, S, G, and/or OIF associated with the local multicast routing update and/or the type of the local multicast routing update. After the notification of process 430 is made, additional local multicast routing updates may be received using process 410.

At a process 440, notification of a peer multicast routing update from a peer router. When the peer router of the router makes a local multicast routing update, the peer router may share that multicast routing update with the router using a notification of a peer multicast routing update. (I.e., the local multicast routing update in the peer router is a peer multicast routing update in the router.) In some examples, the notification may correspond to the notification sent by the peer router in its instance of process 430. In some examples, the notification may be received in one or more messages received over the ICL. In some examples, the notification may include the IIF, S, G, and/or OIF associated with the peer multicast routing update and/or the type of the peer multicast routing update. In some examples, the notification may also include an indication of whether the peer router includes local multicast routing entries of particular types.

At a process 450, one or more multicast routing entries are updated. To provide backup and/or redundancy for its peer router, the router may add, modify, and/or remove one or more synchronized OIFs from the OIFs in the multicast routing entries being maintained by the router. In some examples, the changes made in the synchronized OIFs may depend on the various possible combinations of both synchronized and/or local (*,G), (S,G), and/or (S,G,rpt) multicast routing entries being managed by the router. In some examples, Table II describes the updates that are made to the multicast routing entries based on the type of peer multicast routing update received and the existing multicast routing entries with IIF, S, and/or G values that match the peer multicast routing update received in the notification received during process 440. In some examples, a source-specific prune request may be generated to remove the router from the multicast distribution tree upstream of the router to avoid undesirable duplication of multicast packets received at a later time. In some examples, when a (*,G) and/or a (S,G) entry includes no OIFs in the OIF list after the update, the corresponding entry may be deleted. In some examples, different updates may occur depending on whether the router uses a Type I or Type II approach for (S,G) entries. After the updates of process 450 are made, additional notifications of peer multicast routing updates may be received using process 440.

TABLE II

| Peer Update | Existing Entries | Update(s) |
|---|---|---|
| Create a (*, G) entry with peer OIFs in the peer router | No local (*, G) entry found | Create a (*, G) entry with the peer OIFs as synchronized OIFs |
| | Local (*, G) entry found, but no local (S, G) or (S, G, rpt) entry found | Merge the peer OIFs with the local (*, G) entry |
| | Local (S, G) entries found, but the peer router does not have local (S, G) or (S, G, rpt) entries for the same group | Create/merge the peer OIFs with the local (*, G) entry |
| | | Type I: Merge the peer OIFs to the local (S, G) entries |
| | | Type II: Merge the peer OIFs to the local (S, G) entries with the same IIF as the created peer (*, G) entry |
| | Local (S, G, rpt) entries found, but the peer router does not have local (S, G) or (S, G, rpt) entries for the same group | Create/merge the peer OIFs with the local (*, G) entry |
| | | Merge the peer OIFs with the local (S, G, rpt) entries |
| | Local (S, G) or (S, G, rpt) entries found locally and on the peer router | Create/merge the peer OIFs with the local (*, G) entry |

TABLE II-continued

| Peer Update | Existing Entries | Update(s) |
| --- | --- | --- |
| Add/remove a peer OIF to a (*, G) entry in the peer router | No local (S, G) or (S, G, rpt) entries found | Merge/remove the peer OIFs from the (*, G) entry |
| | Local (S, G) or (S, G, rpt) entries found, but no local (S, G) or (S, G, rpt) entries for that group in the peer router | Merge/remove the peer OIFs from the (*, G) entry<br>Type I: Merge/remove the peer OIFs from the local (S, G) and (S, G, rpt) entries<br>Type II: Merge/remove the peer OIFs from the local (S, G) and (S, G, rpt) entries when the IIF is the same as the peer (*, G) entry |
| | Local (S, G) or (S, G, rpt) entries found locally and on the peer router | Merge/remove the peer OIFs from the (*, G) entry |
| Delete a (*, G) entry with peer OIFs from the peer router | No local (S, G) or (S, G, rpt) entry found | Remove the peer OIFs from the (*, G) entry that are synchronized |
| | Local (S, G) or (S, G, rpt) entry found, but no (S, G) or (S, G, rpt) entries for the same group in the peer router | Remove the peer OIFs from the (*, G) entry that are synchronized<br>Remove the peer OIFs from the (S, G) and (S, G, rpt) entries that are synchronized |
| | Local (S, G) or (S, G, rpt) entries found both locally and in the peer router | Remove the peer OIFs from the (*, G) entry that are synchronized |
| Create an (S, G) entry with peer OIFs in the peer router | No local (S, G) entry found | Create an (S, G) entry with peer OIFs as synchronized OIFs |
| | Local (*, G) entry found, but no local (S, G) or (S, G, rpt) entries found | Type I: Create a synchronized (S, G) entry with the peer OIFs merged with the local (*, G) OIFs<br>Type II: Create a synchronized (S, G) entry with the peer OIFs merged with the local (*, G) OIFs when the IIF of the local (*, G) entry and the created (S, G) entry are the same |
| | Local (S, G, rpt) entry found, but no local (S, G) entry found | Type I: Create an (S, G) entry with the peer OIFs merged with the local (S, G, rpt) OIFs<br>Type II: Create a local (S, G) entry with the peer OIFs merged with the local (S, G, rpt) OIFs when the IIF of the local (S, G, rpt) and the created (S, G) entries are the same |
| | Local (S, G) entry found | Merge the peer OIFs with the local (S, G) entry |
| Add/remove a peer OIF to the (S, G) entry in the peer router | All cases | Type I: Merge/remove the peer OIF from the local (S, G) entry<br>Type II: Merge/remove the peer OIF from the local (S, G) entry when the IIF of the peer (S, G) and the local (S, G) entries are the same |
| Delete an (S, G) entry with peer OIFs in the peer router | All cases | Remove the peer OIFs from the local (S, G) entry |
| Create an (S, G, rpt) entry with peer OIFs in the peer router | No local entries for group G found | Create an (S, G, rpt) entry with peer OIFs as synchronized OIFs |
| | Local (*, G) entry found, but no local (S, G) or (S, G, rpt) entry found | Create an (S, G, rpt) entry<br>Copy the local (*, G) OIFs to the created (S, G, rpt) entry<br>Merge the peer OIFs with the created (S, G, rpt) entry |
| | Local (S, G) entry found, but no local (S, G, rpt) entry found | Type I: Merge the peer OIFs to the local (S, G) entry<br>Type II: : Merge the peer OIFs with the local (S, G) entry when the IIF of the created (S, G, rpt) and the local (S, G) entries are the same |
| | Local (S, G, rpt) entry found | Merge the peer OIFs to the local (S, G, rpt) entry |
| Add/remove a peer OIF from an (S, G, rpt) entry in the peer router | All cases | Type I: Merge/remove the peer OIF from the (S, G) and (S, G, rpt) entries<br>Type II: Merge/remove the peer OIF from the (S, G) and (S, G, rpt) entries when the IIF of the peer (S, G, rpt) entry and the local entries are the same |
| Delete and (S, G, rpt) entry with peer OIFs in the peer router | No local (S, G) entry found | Remove the peer OIFs from the local (S, G, rpt) entry |
| | Local (S, G) entry found | Remove the peer OIFs from the local (S, G) entry |

At a process 460, it is determined whether a peer router is down. The ability of a router to provide backup and/or redundancy for a peer router depends in part on the ability to determine when the peer router is down. In some examples, the router may determine whether the peer router is down based on the exchange of management packets and/or the lack of the exchange of management packets from the peer router. In some examples, the peer router may be determined to be down when heartbeat message are no longer being received from the peer router. In some examples, when the ICL is down, the peer router may be considered to be down as well. When the peer router is down, the router starts a timer using a process 470. When the peer router is up, the router continues to monitor the status of the peer router by repeating process 460.

At the process 470, a timer is started. When the peer router goes down, the router may continue to forward multicast packets to the synchronized OIFs in its multicast routing tables using, for example, method 300. By doing so, the router provides backup and/or redundancy for the peer router during the period in which the multicast routing protocol may detect that the peer router is down and/or to rebuild and/or reconverge the one or more multicast routing trees so as to avoid the peer router. In some examples, the time delay implemented by the timer may be set based on an expected amount of time for the multicast routing protocol to reconverge the multicast routing trees. In some examples, the time delay may be set by an operator responsible for configuring the router.

At a process 480, it is determined whether the timer has timed out. The timer started during process 470 is monitored to determine when the time delay period ends. At the end of the time delay period the timer times out. In some examples, the timer may not be actively monitored and may generate an interrupt and/or an alert when it times out. When the timer times out, the synchronized OIFs are removed from multicast routing entries using a process 490. When the timer is not yet timed out, it further monitored using process 480.

At the process 490, the synchronized OIFs are deleted from the multicast routing entries. When the time period for allowing the multicast routing protocol to reconverge the multicast routing trees ends, the router goes through its multicast routing entries and removes each of the synchronized OIFs from the OIF lists of the multicast routing entries. In some examples, this may occur based on the assumption that the multicast routing protocol has identified alternative multicast routing trees and the router may cease its multicast backup and/or redundancy support for the peer router.

Some embodiments of routers 220 and/or 230 may include non-transient, tangible, machine readable media that include executable code that when run by one or more processors (e.g., one or more processors in control units 222 and/or 232) may cause the one or more processors to perform the processes of methods 300 and/or 400 as described above. Some common forms of machine readable media that may include the processes of methods 300 and/or 400 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A router comprising:
   a control unit; and
   a memory coupled to the control unit, the memory storing one or more first multicast routing entries including one or more second multicast routing entries associated with first multicast routing trees associated with the router and one or more third multicast routing entries associated with second multicast routing trees associated with a peer router, the second multicast routing trees including at least one multicast tree of which the router is not a member;
   wherein the control unit is configured to:
      receive a multicast packet on an input interface;
      determine one or more properties of the multicast packet, the one or more properties including one or more selected from a group consisting of the input interface, a group destination address, and a source address of the multicast packet;
      determine one or more first output interfaces based on the properties and the second multicast routing entries;
      determine one or more second output interfaces based on the properties and the third multicast routing entries; and
      forward copies of the multicast packet to each of the first and second output interfaces;
   wherein the router is configured to be coupled to the peer router via an inter-chassis link (ICL).

2. The router of claim 1 wherein when the input interface is a spanned input interface, the control unit is further configured to forward an additional copy of the multicast packet to the peer router on the input interface using the ICL.

3. The router of claim 1 wherein when the multicast packet is received via the ICL, the control unit is further configured to forward the copies of the multicast packet to the first and second output interfaces that are spanned output interfaces when outgoing ports of the peer router associated with the spanned output interfaces are down.

4. The router of claim 1 wherein the second multicast routing entries are local multicast routing entries and the third multicast routing entries are synchronized multicast routing entries.

5. The router of claim 1 wherein the third multicast routing entries are associated with spanned input interfaces and spanned output interfaces.

6. The router of claim 1 wherein the control unit is further configured to:
   receive one or more notifications associated with one or more multicast routing updates in the peer router; and
   update the third multicast routing entries based on the second multicast routing entries and the multicast routing updates.

7. The router of claim 1 wherein the control unit is further configured to:
   receive one or more multicast routing updates associated with a multicast routing protocol; and
   update the first multicast routing entries based on the multicast routing updates.

8. The router of claim 7 wherein the control unit is further configured to send one or more notifications to the peer router based on the multicast routing updates.

9. The router of claim 7 wherein the control unit updates the first multicast routing entries by merging local output interfaces with synchronized output interfaces.

10. The router of claim 1 wherein the control unit is further configured to:
   determine whether the peer router is down; and
   when the peer router is down, delete the third multicast routing entries after a time delay.

11. A method of multicast routing, the method comprising:
   receiving a multicast packet on an input interface of a router;
   determining one or more properties of the multicast packet, the one or more properties including one or more selected from a group consisting of the input interface, a group destination address, and a source address of the multicast packet;
   determining one or more first output interfaces based on the properties and first multicast routing entries associated with first multicast routing trees associated with the router;
   determining one or more second output interfaces based on the properties and second multicast routing entries associated with second multicast routing trees associated with a peer router coupled to the router via an inter-chassis link (ICL), the second multicast routing trees including at least one multicast tree of which the router is not a member; and
   forwarding copies of the multicast packet to each of the first and second output interfaces.

12. The method of claim 11, further comprising forwarding an additional copy of the multicast packet to the peer router on the input interface using the ICL when the input interface is a spanned input interface.

13. The method of claim 11, further comprising forwarding the copies of the multicast packet to the first and second output interfaces that are spanned output interfaces when outgoing ports of the peer router associated with the spanned output interfaces are down and the multicast packet is received via the ICL.

14. The method of claim 11, further comprising:
   receiving one or more notifications associated with one or more multicast routing updates in the peer router; and
   updating the second multicast routing entries based on the first multicast routing entries and the multicast routing updates.

15. The method of claim 11, further comprising:
   receiving one or more multicast routing updates associated with a multicast routing protocol; and
   updating the first and second multicast routing entries based on the multicast routing updates.

16. The method of claim 15, further comprising sending one or more notifications to the peer router based on the multicast routing updates.

17. An information handling system comprising:
   a peer group comprising:
      a first router comprising a control unit and a memory coupled to the control unit, the memory storing one or more first multicast routing entries;
      a second router; and
      an inter-chassis link (ICL) coupling the first router and the second router;
   wherein the control unit is configured to:
      receive a multicast packet on an input interface;
      determine one or more properties of the multicast packet, the one or more properties including one or more selected from a group consisting of the input interface, a group destination address, and a source address of the multicast packet;
      determine one or more first output interfaces based on the properties and one or more first multicast routing entries associated with first multicast routing trees associated with the first router;
      determine one or more second output interfaces based on the properties and second multicast routing entries associated with second multicast routing trees associated with the second router, the second multicast routing trees including at least one multicast tree of which the first router is not a member;
      forward first copies of the multicast packet to each of the first and second output interfaces; and
      forward a second copy of the multicast packet to the second router on the input interface using the ICL when the input interface is a spanned input interface.

18. The information handling system of claim 17 wherein when the multicast packet is received via the ICL, the control unit is further configured to forward the first copies of the multicast packet to the first and second output interfaces that are spanned output interfaces when outgoing ports of the second router associated with the spanned output interfaces are down.

19. The information handling system of claim 17 wherein the control unit is further configured to:
   receive one or more first multicast routing updates associated with a multicast routing protocol;
   update the first and second multicast routing entries based on the first multicast routing updates;
   send one or more notifications to the second router based on the first multicast routing updates;
   receive one or more notifications associated with one or more second multicast routing updates in the second router; and
   update the second multicast routing entries based on the first multicast routing entries and the second multicast routing updates.

* * * * *